United States Patent
Balliett

(10) Patent No.: US 6,269,536 B1
(45) Date of Patent: *Aug. 7, 2001

(54) PRODUCTION OF LOW OXYGEN METAL WIRE

(75) Inventor: Robert W. Balliett, Westborough, MA (US)

(73) Assignee: H.C. Starck, Inc., Newton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,629

(22) Filed: Mar. 28, 1996

(51) Int. Cl.$^7$ ....................................... H01R 43/00
(52) U.S. Cl. ............................. 29/825; 75/5 BB; 75/221; 148/513; 264/61; 264/125
(58) Field of Search ................... 29/599, 825; 264/125, 264/61; 419/42, 38; 75/0.5 BB, 221; 505/432; 148/513

(56) References Cited

U.S. PATENT DOCUMENTS

| | | | |
|---|---|---|---|
| 3,295,951 | * | 1/1967 | Fincham et al. . |
| 3,779,714 | * | 12/1973 | Nadkarni et al. ................... 29/182.5 |
| 3,884,676 | * | 5/1975 | Nadkarni et al. ................. 75/0.5 BC |
| 4,141,719 | * | 2/1979 | Haakko ............................ 75/0.5 BB |
| 4,219,357 | * | 8/1980 | Yolton et al. ........................... 75/221 |
| 4,440,572 | * | 4/1984 | Nadkarni et al. ...................... 75/232 |
| 5,369,088 | * | 11/1994 | Mukai et al. ......................... 505/432 |
| 5,445,787 | * | 8/1995 | Friedman et al. ..................... 419/38 |
| 5,480,601 | * | 1/1996 | Yamamoto et al. .................. 264/61 |

* cited by examiner

Primary Examiner—Carl J. Arbes
(74) Attorney, Agent, or Firm—Perkins, Smith & Cohen; Jerry Cohen

(57) ABSTRACT

Production of low oxygen forms of tantalum and other refractory metals providing hydrided powder of the metal, forming a tube (10), pouring the metal into the tube, dehydriding the powder in the tube and sealing the tube and extruding to form a rod encased in the tube and further fabricating the rod.

3 Claims, 2 Drawing Sheets

PRODUCTION OF LOW OXYGEN METAL WIRE

BACKGROUND OF THE INVENTION

The present invention is a response to the problem of establishing high purity tantalum wire with under 100 ppm of oxygen impurity for use as an effective lead wire for sintered tantalum powder solid electrolytic capacitors. The invention also involves other metals and usage of such other metals and tantalum in applications other than as lead wires.

In working with tantalum and other reactive metals used for lead wires, and in similar application, problems arise out of the affinity of such metals to oxygen and the high temperatures normally associated with extrusion, forging and other fabrication of such metals. It is known that oxygen contents of several hundred ppm typically encountered with sodium reduced tantalum (i.e, reduction of $K_2TaF_7$ or other salts of tantalum by sodium) will lead to difficulties in later working. The high temperatures of extrusion and/or encountered in the course of anneals and other softening treatments in the course of cold fabrication processes complicate the problem. See, e.g., Michaluk et al., "Characterization of Extruded and Forged Preforms," 1992 paper for a book published that year by the Mineral, Metals and Materials Society.

It is the object of this invention to provide new and improved processing of tantalum and other reactive metals.

SUMMARY OF THE INVENTION

I have conceived of the approach of making wires via a powder metallurgy route using tantalum hydride powders that are packed into a shell. The powders are loosely filled into the shell and then dehydrided in situ while loosely contained in the shell. The shell is then closed in and used as an extrusion billet to produce a rod which can be used directly or subjected to further size reduction by forging, swaging and/or wire drawing or rolling steps to produce a final wire or sheet mill product and/or formed into a final fabricated part at that time or later. Both the extrusion step and later forming step(s) are made more effective by the original steps of provision of loose hydride powders into a container that will become an extrusion billet, dehydriding in situ and immediately sealing up the billet to prevent oxygen absorption and then extruding. After cooling, the extruded product, i.e. the resultant rod, can be cooled and the original can material now constituting a thin surface layer of the rod can be removed. The term "rod" as used herein includes all sizes of the rod and wire range practically achievable via extrusion as well as all cross-section forms.

The process as applied to tantalum includes the more specific steps:

(1) provision of a high purity tantalum body with an oxygen level under 50 ppm, preferably under 25 ppm, e.g. as an electron beam mealted ingot;

(2) hydriding the body by exposure to a vacuum chamber, back-fill of hydrogen to hydride-embrittle the body and preempting sites otherwise susceptible to oxygen pick up;

(3) pulverizing the hydrided body by crushing, grinding and screening to form a coarse powder preferably in a 44–250 mesh range and more preferably minus 120 mesh;

(4) forming an extrusion can with a back-plug and a conical leading nose end and a tube therein;

(5) filling the can via the tube with the hydride powder;

(6) dehydriding the powder by evacuation of hydrogen gas through the tube while maintaining a vacuum ambient by pumping and heating the can containing the loose hydrided powder at about 800° C. until hydrogen content of the scanned powder is under 10 ppm preferably at a 1–2 ppm level;

(7) sealing the tube;

(8) preheating it, e.g. at 700–900° C. for the case of a copper can of six inches diameter for 4 hours;[1]

(9) extruding the heated can in a single pass extrusion reduction of over 4:1, preferably about 16:1, and more preferably in the 20:1 to 50:1 range, to consolidate the powder to a workable rod or wire;

(10) cooling the extruded product (rod) and removing a thin outer layer of it derived from the original can by turning or etching; and

(11) further processing the now exposed rod or wire, which at this point will have a maintainable low oxygen content, preferably under 100 ppm and more preferably below 50 ppm.

[1] Longer times would be used for a longer diameter can on the basis of about 1 additional hour per additional inch of radius. The temperature would be higher for materials such as steel.

Apart from realization of a more feasible processing of the metal, the end product usages are substantially enhanced in a variety of applications including but not limited to electrolytic capacitor lead wire usage.

Other objects, features and advantages will be apparent from the following detailed description of preferred embodiments taken in conjunction with the accompanying drawing in which:

DETAILED DESCRIPTION OF PREFERRED EMBODIMENTS

Figure 1:
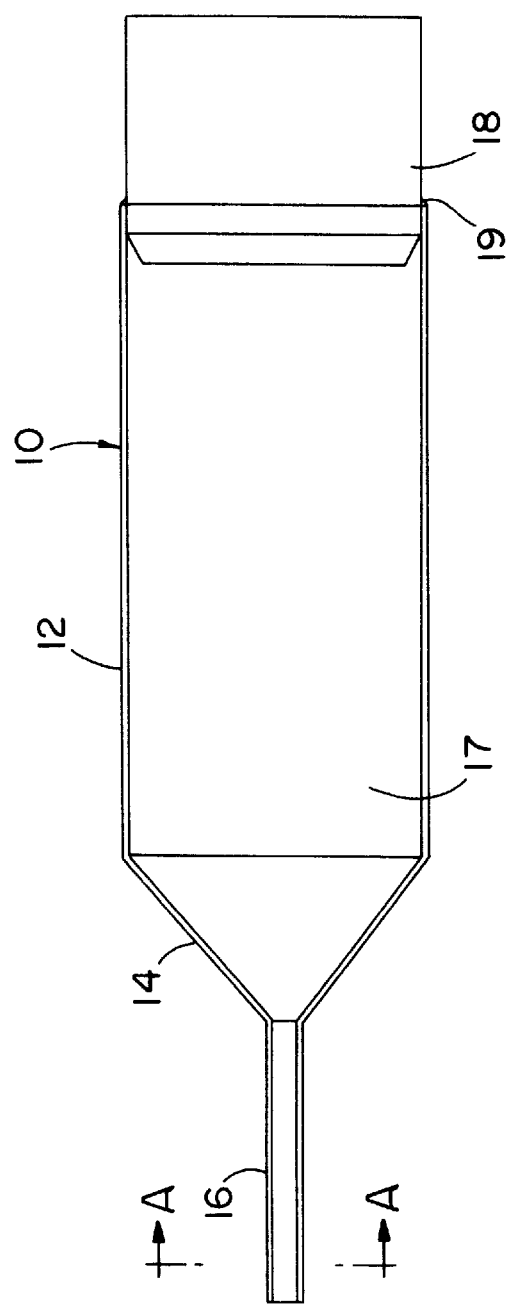
FIG. 1 is a schematic side view and FIG. 2 a front end view of an extrusion can (viewed as indicated by arrows A—A in FIG. 1) used in implementing a preferred embodiment of the invention.
Figure 2:
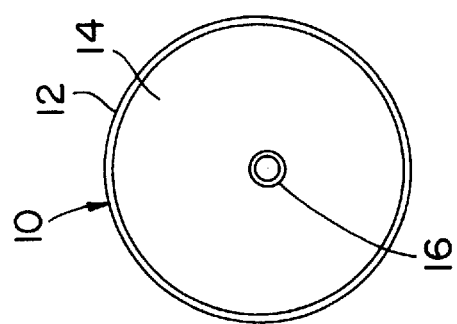

As shown in FIGS. 1–2, an extrusion can 10 usable in the process of the invention comprises a ten to twenty inch long, 6.25 in. diameter 0.060 in. wall cylinder 12 copper or copper-nickel alloy, a 4–5 inch long (approx.) conical front end 14, and an evacuation tube 16 of 0.040 in. wall copper tubing of about six inches length. A solid copper block 18 is welded into the tube's back end. These sizes are scalable up substantially to extrusion billets of several feet long and up to 10–20 in. diameter.

Figure 3:
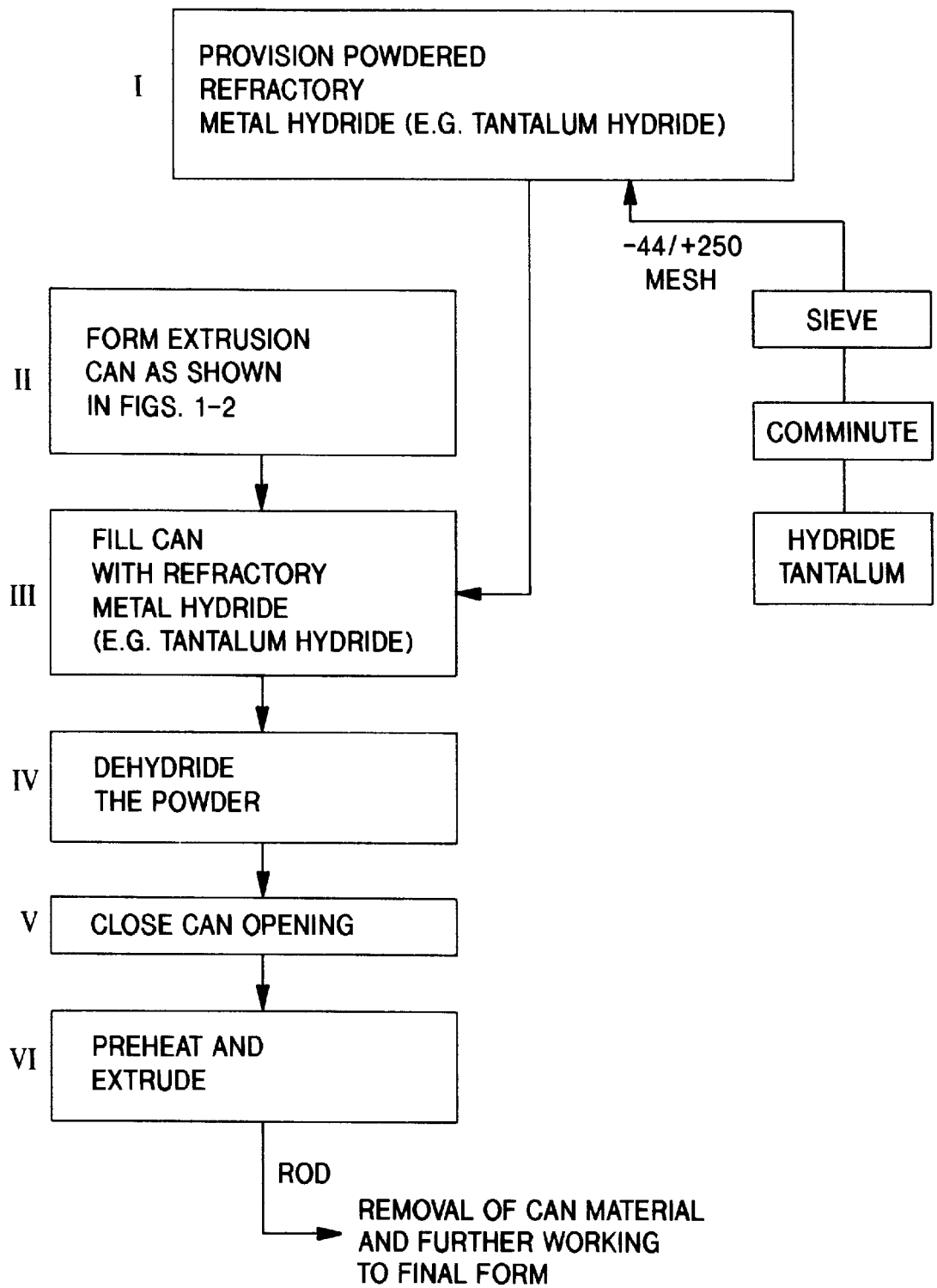
FIG. 3 is a flow chart of the above described process steps, as applied to the case of making tantalum wire.

FIG. 3 shows the process in block diagram form comprising the steps of (I) provision of tantalum hydride powder of 44–250 mesh form or (preferably) minus 120 mesh; (II) forming an extrusion can as shown in FIGS. 1–2 and described above; (III) filing the can with the tantalum hydride powder; (IV) dehydriding the powder; (V) closing "the can opening"; (VI) extruding the filled can.

As mentioned above, loose dehydrided powders are inserted into the interior 17 of the cylinder 12, filling via tube 16. Then the can 10 as a whole is placed in a vacuum furnace to dehydride the powders, in effect pumping via tube 16. The feed end is sealed off and the tube as a whole (billet) can then be extruded.

Hydriding of tantalum powders to embrittle them for use in powder production per se is well known in the capacitor powder arts. See, e.g., U.S. Pat. No. 3,295,951 of Fincham and Villani. It is also well known to add hydrogen to dispersion strengthened metals (e.g. copper, nickel, iron powders strengthened with aluminum oxide inclusions) to reduce any residual oxygen; this is exemplified by teachings of the following U.S. patents of SCM Corporation: U.S. Pat. No. 3,779,714 (Dec. 18, 1973), U.S. Pat. No. 3,884,676 (May 20, 1975), U.S. Pat. No. 3,893,844 (Jul. 18, 1975), U.S. Pat. No. 4,440,572 (Apr. 3, 1984). Following my concept of hydride usage, described above, it was disclosed and claimed by I. Friedman to make tantalum hydride powder, cold isostatic press (CIP) the powder into a billet, dehydride the billet and extrude the billet after wrapping it in a double jacket, with a powder separation between jacket layers. See U.S. Pat. No. 5,445,787 (Aug. 29, 1995) and U.S. Pat. No. 5,482,672 (Jan. 9, 1996).

All the above cited other approaches miss the fundamental point of the present invention—combining a full hydriding of powders to produce a hydrided preform, comminuting it to a desired size while excluding oxygen, dehydriding under a condition where adequate elimination of the hydrogen can be obtained without reintroducing oxygen at unacceptable levels (i.e. loose hydride powders in a shell), completion of the billet configuration and extrusion.

The assembled billet is reduced in size and the powders therein are simultaneously consolidated to a coherent workable form in the course of extrusion.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Method of producing tantalum wires in physical and chemical forms suitable for usage as lead wires of tantalum anodes of electrolytic capacitors, the method comprising the steps of:

(a) providing tantalum hydride of loose powder form in a range from plus 44 mesh to minus 250 mesh size, (b) forming a copper can of extrusion billet form with an end with an opening and tube extension thereof, (c) filling the can with the powder through said opening and tube extension, (d) heating the filled can to about 800° C. and vacuum pumping to remove hydrogen from the hydride powder and to remove hydrogen from the can via said opening and tube extension, (e) sealing the can, (f) preheating the filled can at 700–900° C. for as long as necessary for extrusion preparation, (g) extruding the heated can in a single pass for consolidation of the powder therein to achieve area reduction and to form a further workable rod or wire, (h) cooling the extruding billet and removing the copper therefrom, to expose a tantalum rod or wire, (i) working the rod or wire to a final wire size, whereby a low oxygen form of tantalum can be provided through its hydride and a low oxygen level preserved in the course of dehydriding, extrusion and further working steps to enable production of a lead wire with an oxygen content of less than 100 ppm.

2. The process of claim 1 wherein the tantalum hydride powder of step (a) is about minus 120 mesh.

3. Method of producing tantalum metal mill products, the method comprising the steps of:

(a) providing tantalum hydride of loose powder form in a range from plus 44 mesh to minus 250 mesh size, (b) forming a can of extrusion billet form with an end with an opening, (c) filling the can with the hydride powder through said opening, (d) heating the filled can to about 800° C. and vacuum pumping to remove hydrogen from the hydride powder and to remove hydrogen from the can via said opening, (e) sealing the can, (f) preheating the filled can for as long as necessary for extrusion preparation, (g) extruding the heated can in a single pass for consolidation of the powder therein and to achieve area reduction, (h) cooling the extruding billet and removing the can material therefrom, to expose a tantalum metal rod or wire, (i) working the rod or wire to a final product size, whereby a low oxygen form of the tantalum metal can be provided through its hydride and a low oxygen level preserved in the course of dehydriding, extrusion and further working steps to enable production of a product with an oxygen content of less than 100 ppm.

* * * * *